US006504737B2

(12) United States Patent
Nakajima et al.

(10) Patent No.: US 6,504,737 B2
(45) Date of Patent: Jan. 7, 2003

(54) MAGNETIC CORE FOR SATURABLE REACTOR, MAGNETIC AMPLIFIER TYPE MULTI-OUTPUT SWITCHING REGULATOR AND COMPUTER HAVING MAGNETIC AMPLIFIER TYPE MULTI-OUTPUT SWITCHING REGULATOR

(75) Inventors: Shin Nakajima, Saitama-ken (JP); Hirohiko Miki, Tottori-ken (JP); Sadami Kubota, Tottori-ken (JP); Mutsuhito Sakaguchi, Tottori-ken (JP)

(73) Assignee: Hitachi Metals, Ltd., Yokyo (JP)

( * ) Notice: Subject to any disclaimer, the term of this patent is extended or adjusted under 35 U.S.C. 154(b) by 33 days.

(21) Appl. No.: 09/875,915

(22) Filed: Jun. 8, 2001

(65) Prior Publication Data

US 2001/0032685 A1 Oct. 25, 2001

Related U.S. Application Data

(62) Division of application No. 09/159,648, filed on Sep. 24, 1998, now Pat. No. 6,270,592.

(30) Foreign Application Priority Data

Sep. 26, 1997 (JP) ............................................ 9-261725

(51) Int. Cl.[7] ............................ H02M 5/42; H01F 1/14

(52) U.S. Cl. .......................... 363/91; 363/20; 148/306; 148/307

(58) Field of Search ............................ 363/15, 16, 20, 363/21.01, 21.04, 82, 90, 91; 148/306, 307, 308

(56) References Cited

U.S. PATENT DOCUMENTS 5,132,889 A * 7/1992 Hitchcock et al. ............ 363/17
5,151,137 A 9/1992 Yoshizawa et al. ......... 148/313
5,178,689 A 1/1993 Okamura et al. ........... 148/306
5,956,236 A * 9/1999 Wunderlich .................. 363/17

FOREIGN PATENT DOCUMENTS

EP 0 299 498 B1 9/1993
JP 63-56168 3/1988
JP 2-61177 12/1990
JP 7-77167 8/1995

* cited by examiner

*Primary Examiner*—Matthew V. Nguyen
(74) *Attorney, Agent, or Firm*—Sughrue Mion, PLLC

(57) ABSTRACT

A magnetic core for use in a saturable reactor made of an Fe-based soft-magnetic alloy comprising as essential alloying elements Fe, Cu and M, wherein M is at least one element selected from the group consisting of Nb, W, Ta, Zr, Hf, Ti and Mo, and having an alloy structure at least 50% in area ratio of which being fine crystalline particles having an average particle size of 100 nm or less. The magnetic core has control magnetizing properties of a residual operating magnetic flux density ΔBb of 0.12 T or less, a total control operating magnetic flux density ΔBr of 2.0 T or more, and a total control gain Gr of 0.10–0.20 T/(A/m) calculated by the equation: Gr=0.8×(ΔBr−ΔBb)/Hr, wherein Hr is a total control magnetizing force defined as a control magnetizing force corresponding to 0.8×(ΔBr−ΔBb)+ΔBb.

5 Claims, 3 Drawing Sheets

MAGNETIC CORE FOR SATURABLE REACTOR, MAGNETIC AMPLIFIER TYPE MULTI-OUTPUT SWITCHING REGULATOR AND COMPUTER HAVING MAGNETIC AMPLIFIER TYPE MULTI-OUTPUT SWITCHING REGULATOR

This is a Divisional of Application No. 09/159,648 filed Sep. 24, 1998, now U.S. Pat. No. 6,270,592 , the disclosure of which is incorporated herein by reference.

BACKGROUND OF THE INVENTION

The present invention relates to a magnetic core for use in a saturable reactor, a multi-output switching regulator controlling the output voltage by a magnetic amplifier, and a computer equipped with such a multi-output switching regulator.

The multi-output switching regulator has been used in personal computers and office computers. For example, in a PC AT-X type computer, a most typical desktop personal computer, a multi-output switching regulator with five outputs, i.e., +5V output (1.5–20 A), +3.3V output (0–20 A), +12V output (0.2–8 A), −5V output (0–0.3 A) and −12V output (0–0.4 A) is used when a larger output capacity is required. In the above five-output switching regulator, the main circuit comprises a forward converter with single switching element or a half bridge converter. The main output (+5V output) is controlled by a pulse-width modulation of a switching element located in a primary side of a main transformer, and the secondary outputs (+3.3V, +12V, −5V and −12V outputs) are controlled at the secondary side of the main transformer.

One of the methods for controlling the secondary outputs at the secondary side of the main transformer is a control by a magnetic amplifier located at the secondary side of the main transformer. The magnetic amplifier basically comprises, as the main components, a saturable reactor, a diode and an error amplifier. This method has advantages of simultaneously attaining a small size, a high efficiency, a low noise generation and a high reliability, which have not been attained by a control using a chopper circuit and a dropper circuit utilizing semiconductor elements. It has been known in the art that the control by the magnetic amplifier is advantageous for controlling the output with a low voltage and a large load current, particularly in view of a high efficiency, because the loss in the saturable reactor serve as a control element is small as compared with the loss in the semiconductor control element used in the chopper circuit or the dropper circuit even when the load current is large. Therefore, in the multi-output switching regulator for the PC AT-X type personal computer, the magnetic amplifier has been widely used for controlling the +3.3 V and +12 V outputs having a large load current. In the present invention, the switching regulator utilizing the magnetic amplifier is referred to as a magnetic amplifier type switching regulator.

The switching frequency of the magnetic amplifier type multi-output switching regulator is usually set to about 50–200 kHz. Therefore, a Co-based amorphous core has been widely used as the magnetic core for the saturable reactor of the magnetic amplifier. However, in the magnetic amplifier type multi-output switching regulator incorporated with a saturable reactor having the Co-based amorphous core, the secondary output voltage being controlled by the magnetic amplifier is lower than the reference value due to the voltage drop by the saturable reactor when the load current increases even if the reset current Ir for the saturable reactor is made zero. The output voltage drop is attributable to a residual operating magnetic flux density ΔBb of the core and an unfavorable reset of the saturable reactor by a reverse recovery current Irr from a diode connected in series to the saturable reactor.

The voltage drop by the saturable reactor increases with increasing residual operating magnetic flux density ΔBb when the core size and the number of turns of the saturable reactor are constant. Also, the magnetic flux density ΔBr to be reset by the reverse recovery current Irr from the diode is larger in a core which acquires a larger control magnetic flux density ΔB by a small control magnetizing force when the core size and the number of turns of the saturable reactor are constant.

In this connection, it has been known in the art that the voltage drop by the saturable reactor is smaller in using an anisotropic 50%-Ni permalloy core than in using the Co-based amorphous core when the core size and the number of turns of the saturable reactor are the same, because the anisotropic 50%-Ni permalloy core shows a small residual operating magnetic flux density ΔBb and acquires a smaller control magnetic flux density ΔB when magnetized by the same control magnetic force as applied to the Co-based amorphous core. However, since the anisotropic 50%-Ni permalloy core shows a large core loss at a higher frequency range, the switching frequency is limited to about 20 kHz at most, and it has been recognized in the art that the use of the anisotropic 50%-Ni permalloy core at a switching frequency higher than 20 kHz has been impractical, because such a use requires an extremely increased number of turns and causes a significant temperature rise of the saturable reactor. Therefore, the anisotropic 50%-Ni permalloy core fails to reduce the size of the magnetic amplifier type multi-output switching regulator and is not suitable for the application such as a personal computer which requires a reduced size.

In the present invention, ΔB, ΔBb and ΔBr are defined as shown in FIG. 5, wherein Br is a residual magnetic flux density, H is a control magnetizing force, and $H_{Lm}$ is the maximum value of a gate magnetizing force.

In the magnetic amplifier type multi-output switching regulator, for example, used in the PC AT-X type desktop personal computer, both the main output (+5V output) and the secondary output (+3.3V output) are usually taken out of the same secondary winding of the transformer, because the potential difference between the +5V output and the +3.3V output is small. Therefore, it has been known that the voltage drop in the +3.3V output cannot be avoided by using a secondary winding for the +5V output and another secondary winding for the +3.3V output with a number of turns larger than that of the secondary winding for the +5V output.

To eliminate the above disadvantage, Japanese Patent Publication No. 2-61177 discloses a magnetic amplifier in which a reset circuit comprising series-connected rectifying diode and control element is connected in parallel to both the ends of a saturable reactor, thereby to control the reset of the saturable reactor by the control element. However, the proposed magnetic amplifier requires at least four additional circuit elements to spoil the advantage such as a small number of circuit elements of the magnetic amplifier type multi-output switching regulator.

Japanese Patent Laid-Open No. 63-56168 discloses a magnetic control type switching regulator in which a saturable reactor has a winding for forming a short circuit in addition to a main winding for output, thereby to avoid the drop in the output voltage attributable to a dead time and an unfavorable reset of the saturable reactor by the reverse recovery current Irr of a rectifying diode. However, the proposed method is insufficient in preventing the voltage drop of the saturable reactor as compared with the method disclosed in Japanese Patent Publication No. 2-61177, because the additional winding for the short circuit, an additional diode serving as an active element in the short circuit and the reverse recovery current from the additional diode cause the voltage drop of the saturable reactor.

Japanese Patent Publication No. 7-77167 discloses a magnetic core made of an Fe-based alloy containing Fe, Cu and M as essential components, wherein M is at least one element selected from the group consisting of Nb, W, Ta, Zr, Hf, Ti and Mo. It is described that the saturable reactor made of the proposed magnetic core has a high squareness ratio and shows a small core loss and a high magnetic flux density. However, the proposed magnetic core shows an increased ΔBb due to the impact or shock thereon during the production process, and this problem has not been avoided by the production method disclosed therein. Therefore, a magnetic amplifier type multi-output switching regulator utilizing a saturable reactor made of the proposed magnetic core generates an output voltage lower than the reference value when the load current is large.

OBJECT AND SUMMARY OF THE INVENTION

Accordingly, an object of the present invention is to provide a highly reliable multi-output switching regulator having a magnetic amplifier constructed by a reduced number of circuit elements and being capable of providing a stable output.

As a result of the intense research in view of the above objects, the inventors have found that a saturable reactor having a magnetic core made of an Fe-based alloy having a specific chemical composition, a specific alloy structure and specific control magnetizing properties exhibits a low voltage drop when a reset current Ir is zero and acquires a large control magnetic flux density ΔB by a small reset current Ir. With such a saturable reactor, the number of turns of the winding on the saturable reactor has been reduced and the temperature rise of the saturable reactor at a large load current and at no load has been minimized. Based on these findings, the inventors have further found that a multi-output switching regulator utilizing a magnetic amplifier having such a saturable reactor prevents the secondary output voltage being controlled by the magnetic amplifier from becoming lower than the reference value even when the load current increases, and can be operated at a higher frequency, thereby to provide a magnetic amplifier type multi-output switching regulator with a reduced size, a high efficiency and a high reliability.

Thus, in a first aspect of the present invention, there is provided a magnetic core for use in a saturable reactor made of an Fe-based soft-magnetic alloy comprising as essential alloying elements Fe, Cu and M, wherein M is at least one element selected from the group consisting of Nb, W, Ta, Zr, Hf, Ti and Mo, and having an alloy structure at least 50% in area ratio of which being fine crystalline particles having an average particle size of 100 nm or less, wherein the magnetic core has, when measured at a core temperature of 25° C. using a 50 kHz monopolar rectangular voltage with an on-duty ratio of 0.5, control magnetizing properties of: (1) 0.12 T or less of a residual operating magnetic flux density ΔBb; (2) 2.0 T or more of a total control operating magnetic flux density ΔBr; and (3) 0.10–0.20 T/(A/m) of a total control gain Gr calculated by the equation: Gr=0.8×(ΔBr−ΔBb)/Hr, wherein Hr is a total control magnetizing force defined as a control magnetizing force corresponding to 0.8×(ΔBr−ΔBb)+ΔBb.

In a second aspect of the present invention, there is provided a multi-output switching regulator having a magnetic amplifier comprising a saturable reactor which is constructed from the magnetic core as defined above.

DETAILED DESCRIPTION OF THE INVENTION

Figure 1:
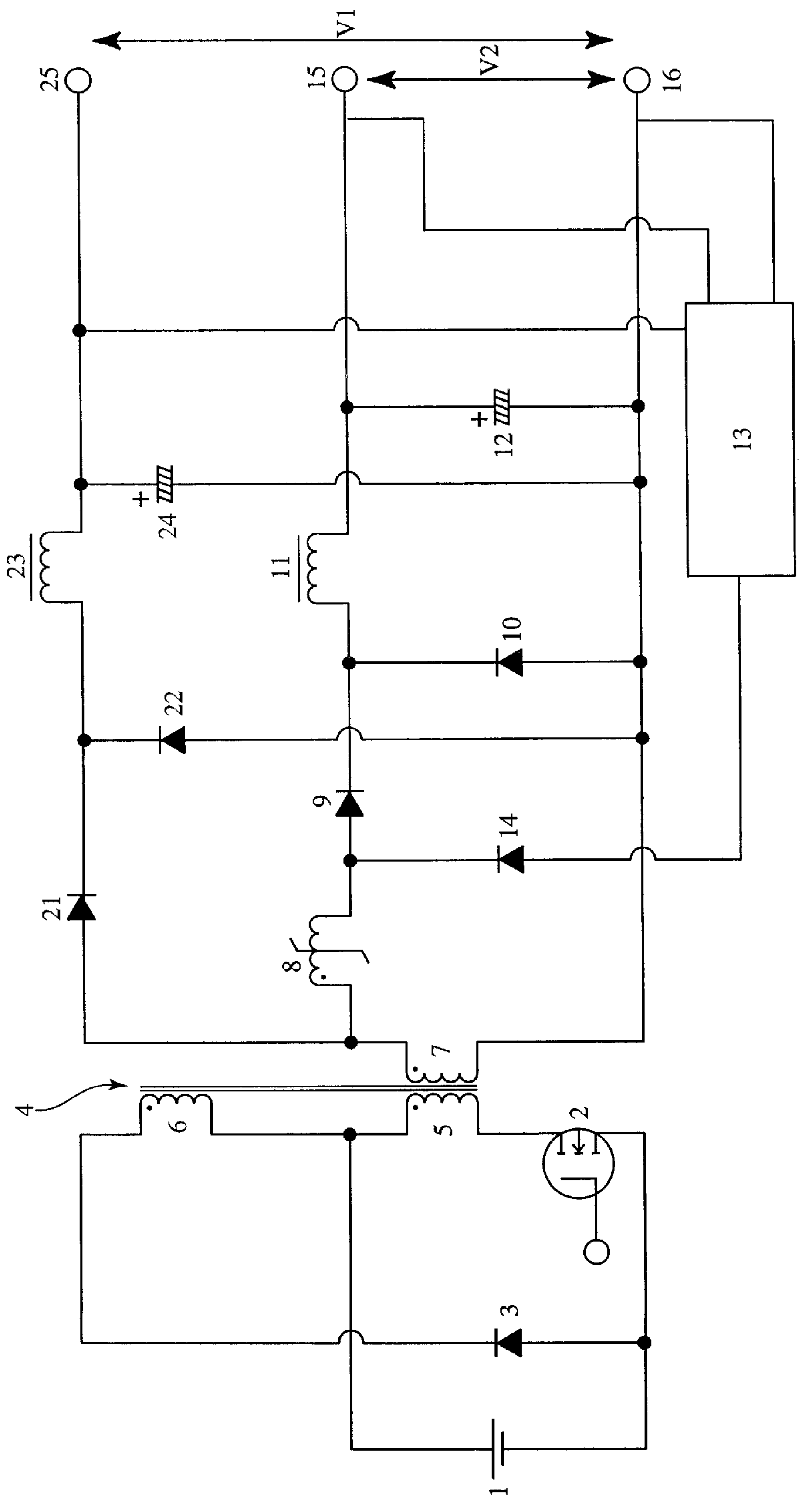
FIG. 1 is a schematic diagram showing a circuit of the magnetic amplifier type multi-output switching regulator of the present invention.

The magnetic core of the present invention is produced from an Fe-based soft magnetic alloy comprising as essential alloying elements Fe, Cu and M, wherein M is at least one element selected from the group consisting of Nb, W, Ta, Zr, Hf, Ti and Mo, at least 50% in area ratio of the alloy structure being fine crystalline particles having an average particle size of 100 nm or less.

The Fe-based soft magnetic alloy used for the magnetic core according to the present invention has the chemical composition represented by the general formula:

$$(Fe_{1-a}X_a)_{100-x-y-z-\alpha}Cu_xSi_yB_zM_\alpha M'_\beta M''_\gamma$$

wherein X is Co and/or Ni, M is at least one element selected from the group consisting of Nb, W, Ta, Zr, Hf, Ti and Mo, M' is at least one element selected from the group consisting of V, Cr, Mn, At, platinum group elements, Sc, Y, rare earth elements, Au, Zn, Sn and Re, M" is at least one element selected from the group consisting of C, Ge, P, Ga, Sb, In, Be and As, and a, x, y, z, α, β and γ respectively satisfy $0 \leqq a \leqq 0.5$, $0.1 \leqq x \leqq 3$, $0 \leqq y \leqq 30$, $0 \leqq z \leqq 25$, $5 \leqq y+z \leqq 30$, $0.1 \leqq \alpha \leqq 30$, $0 \leqq \beta \leqq 10$ and $0 \leqq \gamma \leqq 10$.

Fe may be substituted by Co and/or Ni in the range of up to a =0.5. When "a" exceeds 0.5, the control magnetizing properties of the magnetic core are deteriorated. However, to have good magnetic properties such as low core loss and magnetostriction, "a" is preferably 0–0.1. Particularly; to provide a low magnetostriction alloy, the range of "a" is preferably 0–0.05.

Cu is an indispensable element, and its content "x" is 0.1–3 atomic %. When it is less than 0.1 atomic %, substantially no effect of adding Cu can be obtained. On the other hand, when it exceeds 3 atomic %, the resulting magnetic core has poor control magnetizing properties as compared with those containing no Cu.

Cu and Fe have a positive interaction parameter so that their solubility is low. Accordingly, when the alloy is heated while it is amorphous, iron atoms or copper atoms tend to gather to form clusters, thereby producing compositional fluctuation. This produces a lot of domains likely to be crystallized to provide nuclei for generating fine crystalline particles. These crystalline particles are based on Fe, and since Cu is substantially not soluble in Fe, Cu is ejected from the fine crystalline particles, whereby the Cu content in the vicinity of the crystalline particles becomes high. This presumably suppresses the growth of crystalline particles. Because of the formation of a large number of nuclei and the suppression of the growth of crystalline particles by the addition of Cu, the crystalline particles are made fine, and this phenomenon is accelerated by the addition of at least one essential base metal element M selected from the group consisting of Nb, W, Ta, Zr, Hf, Ti and Mo.

The essential base metal elements M have a function of elevating the crystallization temperature of the alloy. Synergistically with Cu having a function of forming clusters and thus lowering the crystallization temperature, M suppresses the growth of the precipitated crystalline particles, thereby making them fine. The content of M ("α") is 0.1–30 atomic %. Without adding the essential base metal element, the crystalline particles are not fully made fine and thus the soft magnetic properties of the resulting magnetic core are poor. A content exceeding 30 atomic % causes an extreme decrease in saturation magnetic flux density. Particularly Nb and Mo are effective, and particularly Nb acts to keep the crystalline particles fine, thereby providing excellent soft magnetic properties.

Si and B are elements particularly for making the alloy structure fine. The Fe-based soft magnetic alloy is usually produced by once forming an amorphous alloy with the addition of Si and B, and then forming fine crystalline particles by heat treatment. The content of Si ("y") and that of B ("z") are $0 \leqq y \leqq 30$ atomic %, $0 \leqq z \leqq 25$ atomic %, and $5 \leqq y+z \leqq 30$ atomic %, because the magnetic core would have an extremely reduced saturation magnetic flux density if otherwise.

M', which is at least one element selected from the group consisting of V, Cr, Mn, At, platinum group elements, Sc, Y, rare earth elements, Au, Zn, Sn and Re, may be optionally added for the purpose of improving corrosion resistance or magnetic properties and of adjusting magnetostriction, but its content is at most 10 atomic %. When the content of M' exceeds 10 atomic %, an extreme decrease in a saturation magnetic flux density occurs.

The Fe-based soft magnetic alloy may contain 10 atomic % or less of at least one element M" selected from the group consisting of C, Ge, P, Ga, Sb, In, Be and As. These elements are effective for making the alloy amorphous, and when added with Si and B, they help make the alloy amorphous and also are effective for adjusting the magnetostriction and Curie temperature of the alloy.

The Fe-based soft magnetic alloy used in the present invention has an alloy structure, at least 50% in area ratio of which consists of fine crystalline particles when determined by a photomicrograph. These crystalline particles are based on α-Fe having a bcc structure, in which Si and B, etc. are dissolved. These crystalline particles have an extremely small average particle size of 100 nm or less, and are uniformly distributed in the alloy structure. Incidentally, the average particle size of the crystalline particles is determined by micrographically measuring the maximum size of each particle and averaging them. When the average particle size exceeds 100 nm, good soft magnetic properties are not obtained. The lower limit of the average particle size is usually about 5 nm. The remaining portion of the alloy structure other than the fine crystalline particles may be mainly amorphous. Even with fine crystalline particles occupying substantially 100% of the alloy structure, the Fe-based soft magnetic alloy has sufficiently good magnetic properties.

The Fe-based soft magnetic alloy and the magnetic core of the present invention are produced, for example, by the following method. First, an alloy melt having the above chemical composition is rapidly quenched by known liquid quenching methods such as a single roll method, a twin roll method, etc. to form amorphous alloy ribbons. Usually amorphous alloy ribbons have a thickness of 5–100 μm or so, and those having a thickness of 25 μm or less are particularly suitable as magnetic core materials for high-frequency use. The amorphous alloys may contain crystal phases, but the alloy structure is preferred to be substantially amorphous to make sure the formation of uniform fine crystalline particles by a subsequent heat treatment.

The amorphous ribbon is then wound to a toroidal shape while applying a tension in the length direction of the amorphous ribbon. The tension is 20 gf or less per mm width of the ribbon, and preferably 12 gf or less per mm width. By applying the tension within the above range, the stress generated in the amorphous ribbon is reduced to prevent the residual operating magnetic flux density ΔBb of the magnetic core from increasing. The thickness tolerance of the toroidally wound ribbon should be within the range of "width of ribbon+0.3 mm" so as to prevent the increase in the residual operating magnetic flux density ΔBb due to the impact or shock onto the toroidal magnetic core during the production of the saturable reactor. The application of the tension of the above range and the thickness tolerance within the above range are important for the magnetic core to acquire the control magnetizing properties specified in the present invention. An insulating coating made of ceramics, etc. may be interposed between the adjacent ribbon layers by laying the insulating coating on the ribbon and winding them together.

Figure 2:
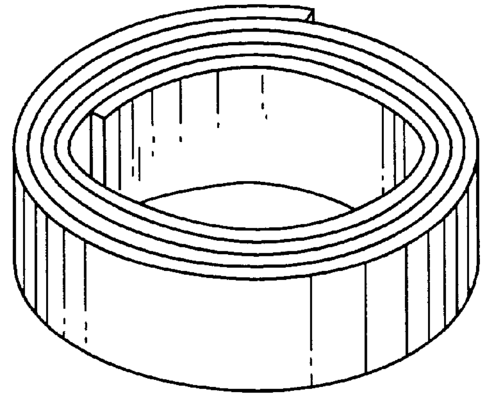
FIG. 2 is a schematic view showing a magnetic core of the present invention.

The toroidally wound ribbon is then subjected to heat treatment while applying a magnetic field of 200 A/m or more along the magnetic path of the wound ribbon in an inert gas atmosphere such as nitrogen atmosphere. The temperature is raised from room temperature to a temperature at which the amorphous ribbon is not crystallized, usually 440–480° C. although dependent on the chemical composition of the alloy, at a temperature rising rate of 5–15° C./min, and maintained there for 10–60 minutes. By the above pre-heating, the temperature gradient produced in the heat-treating furnace during the temperature rise is minimized. The temperature of the pre-heating is preferred to be as higher as possible unless the crystallization is initiated. After the pre-heating, the temperature is raised to 540–580° C. at a temperature rise rate of 1–5° C./min and maintained there for 0.5–2 hours to crystallize the amorphous ribbon. Then, the temperature is lowered to about 100° C. at a cooling rate of 1.5–7.3° C./min, and thereafter allowed to cool down to room temperature, thereby to obtain a toroidal magnetic core of the present invention, as shown in FIG. 2, having a size of 6–100 mm in outer diameter, 4–80 mm in inner diameter and 2–25 mm in thickness.

Figure 3:
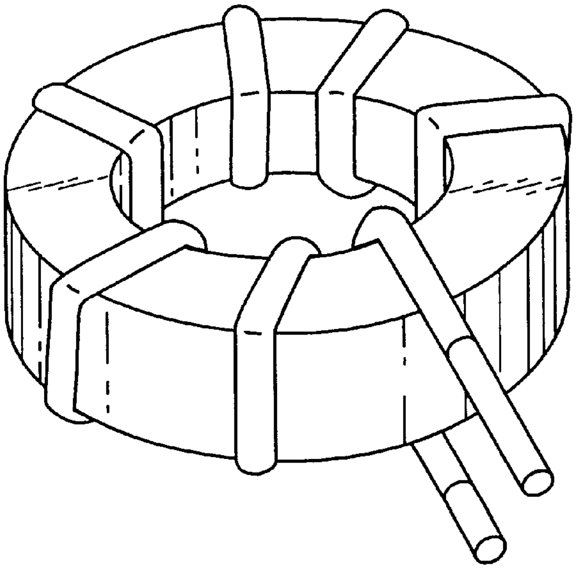
FIG. 3 is a schematic view showing a saturable reactor of the present invention.

The magnetic core thus produced is placed in an insulating resin case made of polyethylene terephthalate, etc. with a silicone grease, and a winding having suitable number of turns is wound over its perimeter to obtain a saturable reactor as shown in FIG. 3. In the present invention, a high performance is obtained in a reduced number of turns.

The magnetic core produced in the manner as described above has the following control magnetizing properties when measured at a core temperature of 25° C. while operated by 50 kHz monopolar rectangular voltage with an on-duty ratio of 0.5.

The residual operating magnetic flux density ΔBb is 0.12 T or less, and preferably 0.08 T or less. ΔBb higher than 0.12

T detrimentally narrowers the controlable range of the output of the magnetic amplifier when driven at 20 kHz or higher frequency. The total control operating magnetic flux density ΔBr is 2.0 T or more, and preferably 2.0–3.0 T. ΔBr less than 2.0 T is unfavorable because the saturable reactor used in the magnetic amplifier requires an increased number of turns when driven at 20 kHz or higher frequency.

The total control gain Gr is 0.10–0.20 T/(A/m). The total control gain Gr is calculated from the following equation:

$$Gr=0.8\times(\Delta Br-\Delta Bb)/Hr$$

wherein Hr is a total control magnetizing force defined as a control magnetizing force corresponding to 0.8×(ΔBr−ΔBb)+ΔBb. When Gr is outside the above range, the saturable reactor in the magnetic amplifier requires an extremely large control electric power.

Figure 4:
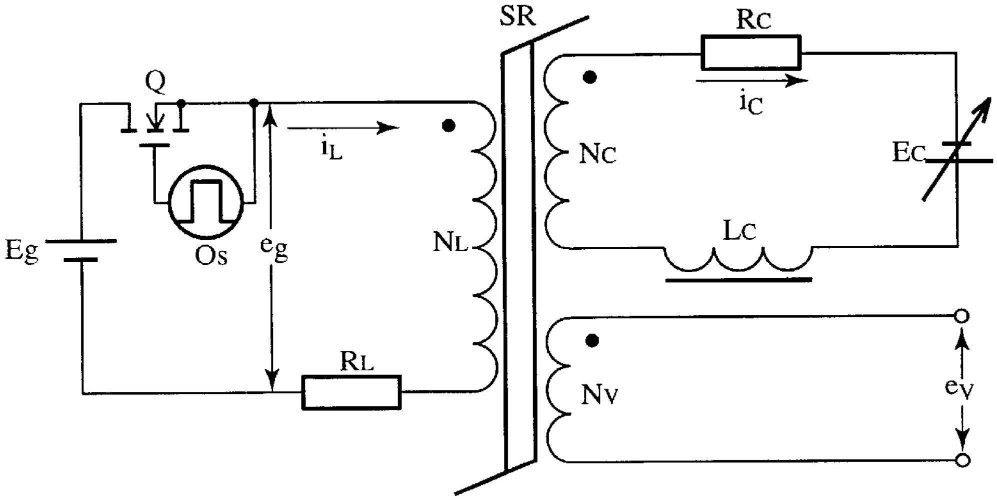
FIG. 4 is a schematic diagram showing a measuring circuit used for measuring the control magnetizing properties.
Figure 5:
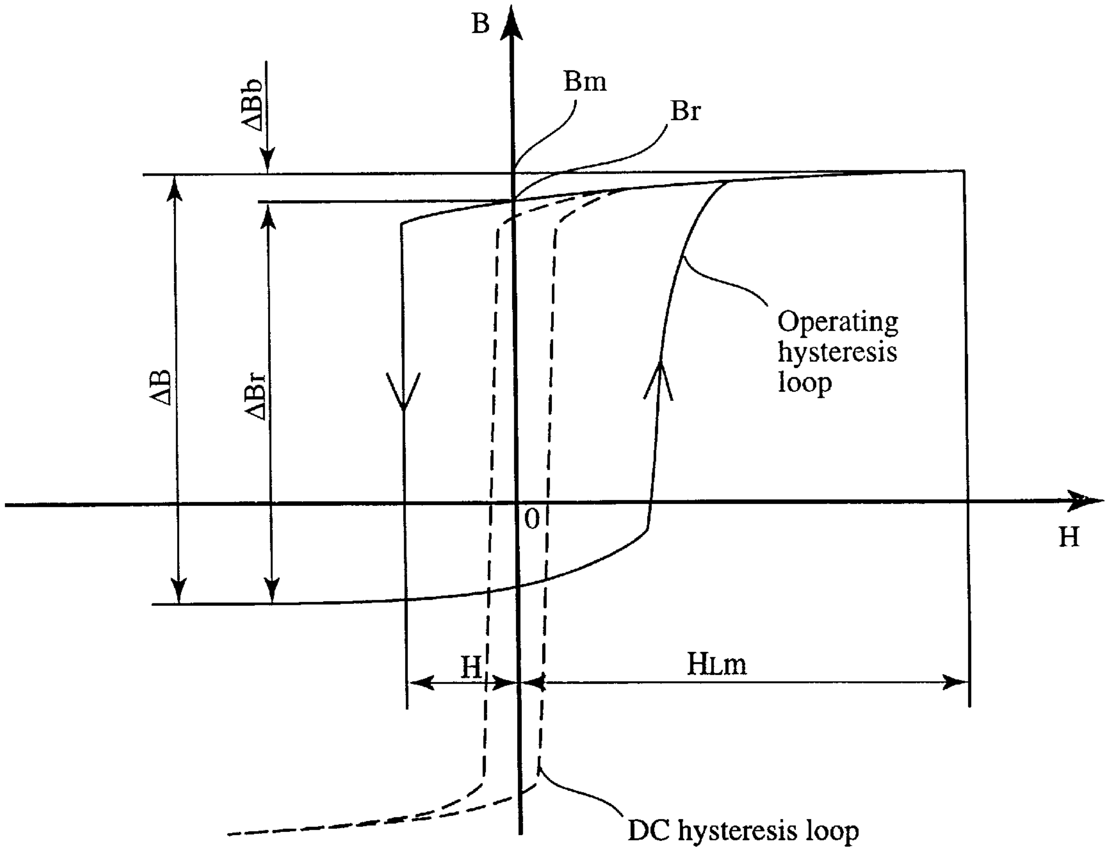
FIG. 5 is an operating hysteresis loop showing the definitions of the control magnetizing properties.

The above control properties were measured using a measuring circuit as shown in FIG. 4. A winding $N_L$, corresponding to an output winding of a saturable reactor SR used in the magnetic amplifier, is connected to an AC powder supply Eg through a resistor $R_L$. A winding Nc is a control winding, and connected to a variable DC power supply Ec through an inductor Lc and a resistor Rc. A winding Nv is a winding for determining ΔB. Q is a switching transistor. The integral value of the terminal voltage $e_v$ over the period of dead time was determined by a digital oscilloscope Os, which was then divided by the number of turns of the winding Nv and the effective cross-sectional area of the core to obtain ΔB. As shown in FIG. 5, ΔBb is a difference between the maximum magnetic flux density Bm and the residual magnetic flux density Br. ΔBr is related to ΔB by the equation of ΔBr=ΔB−ΔBb. The control magnetizing force H was obtained by dividing a product of a measured value of $i_c$ and the number of turns of the winding Nc by an average magnetic path of the core.

In FIG. 1, shown is a circuit of a preferred embodiment of the magnetic amplifier type multi-output switching regulator having the saturable reactor of the present invention. The switching regulator comprises a primary circuit at a primary side of a main transformer 4, and a secondary circuit at a secondary side of the main transformer 4.

The primary circuit basically comprises an input DC power source 1, a switching element 2 (MOS-FET: metal oxide semiconductor-field effect transistor) and a primary winding 5, each being interconnected in series. A diode 3 and a second primary winding 6 are further incorporated into the primary circuit as shown in FIG. 1.

The secondary circuit comprises a main output circuit for controlling and stabilizing a main output V1 (between output terminals 16 and 25 by a pulse-width controlling function of the switching element 2, and a secondary output circuit. The main output circuit shown in FIG. 1 is a forward converter with single switching element and basically comprises an input DC power source 1, the switching element 2, a transformer 4, diodes 21, 22, a smoothing choke coil 23, and a smoothing capacitor 12. The secondary output circuit comprises a magnetic amplifier for controlling and stabilizing a secondary output V2 (between output terminals 16 and 15), diodes 9, 10, 14, a smoothing choke coil 11, and a smoothing capacitor 12. The magnetic amplifier shown in FIG. 1 is a Ramey's quick-response type and comprises a saturable reactor 8, a diode 9, a diode 14 and an error amplifier 13. The anode portion of the diode 9 is connected to the saturable reactor 8, while the cathode portion of the diode 14 is connected to a node between the saturable reactor 8 and the diode 9 in a shunt configuration, and the anode portion thereof is connected to an output terminal 16 through the error amplifier 13.

In a preferred embodiment of the magnetic amplifier type multi-output switching regulator of the present invention, both the main output circuit and the secondary output circuit are respectively connected to the same end of a secondary winding 7. With such a construction, the voltage drop in the secondary output being controlled by the magnetic amplifier is effectively avoided without using additional elements or circuits as proposed in the prior art such as Japanese Patent Publication No. 2-61177 and Japanese Patent Laid-Open No. 63-56168 mentioned above even when the load current of the secondary output increases, thereby to make it possible to obtain a small-size magnetic amplifier type multi-output switching regulator with a high efficiency and a high reliability.

A further reduction in size and a further improvement in the efficiency and reliability can be achieved when the output voltage of the main output circuit is +5V and the output voltage of the secondary output circuit is +3.3V, because the secondary output voltage is prevented from being lower than the reference value of +3.135V even when the load current of the secondary output increases.

The switching frequency of the magnetic amplifier type multi-output switching regulator is preferably 30–150 kHz in view of obtaining a small-size saturable reactor with a high efficiency and a high reliability. In addition, since the above switching frequency range is lower than the frequency range regulated by CISPR (Comité International Spécial des Perturbations Radioélectriques) Pub. 11, the noise terminal voltage is easily avoided.

The present invention will be further described while referring to the following Examples which should be considered to illustrate various preferred embodiments of the present invention.

EXAMPLE 1

Each melt having respective chemical composition shown in Table 1 was formed into a ribbon of 5 mm in width and 20 μm in thickness. The X-ray diffraction and the transmission electron photomicrograph of each ribbon showed that the resulting ribbon was substantially amorphous.

Next, the amorphous ribbon was formed into a toroidal wound ribbon while applying a tension in the length direction of the ribbon. The tension and the thickness tolerance of the wound ribbon are shown in Table 1.

The toroidal wound ribbon was then subjected to heat treatment in nitrogen atmosphere while applying a magnetic field of 200 A/m in the direction of magnetic path of the wound ribbon. Specifically the toroidal wound ribbon was heated from room temperature to 470° C. over 1 hour and kept at 470° C. for 30 minutes. Then, the temperature was raised from 470° C. to a temperature shown in Table 1 over 30 minutes and kept there for one hour to crystallize the amorphous ribbon. The toroidal wound ribbon thus treated was cooled from 540° C. to 100° C. over 3 hours, and allowed to cool down in air to room temperature, thereby obtaining each toroidal magnetic core. Further, other magnetic cores were produced by winding amorphous ribbon (Comparative Examples 15–17) or permalloy ribbon (Comparative Examples 18–19).

The size of the magnetic cores thus produced was 10 mm in inner diameter, 13 mm in outer diameter and 5 mm in thickness.

TABLE 1

| No. | Chemical Composition (atomic %) | Tension (gf) | Core Thickness (mm) | Heat Treatment Temperature (° C.) | Magnetic Field (A/m) |
|---|---|---|---|---|---|
| Invention | | | | | |
| 1 | $Fe_{74}Cu_{1.5}Si_{13.5}B_9Nb_2$ | 60 | 5.2 | 540 | 200 |
| 2 | $Fe_{74}Cu_{1.5}Si_{13.5}B_9Nb_2$ | 100 | 5.3 | 540 | 200 |
| 3 | $Fe_{74}Cu_{1.5}Si_{13.5}B_9Mo_2$ | 60 | 5.3 | 540 | 200 |
| 4 | $Fe_{74}Cu_{1.5}Si_{13.5}B_9Mo_2$ | 100 | 5.2 | 540 | 200 |
| 5 | $Fe_{72}Cu_1Si_{14}B_8Zr_5$ | 60 | 5.3 | 540 | 200 |
| 6 | $Fe_{71}Cu_1Si_{14}B_9Nb_5$ | 60 | 5.2 | 540 | 200 |
| Comparison | | | | | |
| 7 | $Fe_{74}Cu_{1.5}Si_{13.5}B_9Nb_2$ | 100 | 5.3 | 590 | 200 |
| 8 | $Fe_{74}Cu_{1.5}Si_{13.5}B_9Nb_2$ | 100 | 5.4 | 540 | 200 |
| 9 | $Fe_{74}Cu_{1.5}Si_{13.5}B_9Nb_2$ | 120 | 5.3 | 540 | 200 |
| 10 | $Fe_{74}Cu_{1.5}Si_{13.5}B_9Mo_2$ | 100 | 5.3 | 590 | 200 |
| 11 | $Fe_{74}Cu_{1.5}Si_{13.5}B_9Mo_2$ | 120 | 5.2 | 540 | 200 |
| 12 | $Fe_{72}Cu_1Si_{14}B_8Zr_5$ | 100 | 5.2 | 590 | 200 |
| 13 | $Fe_{71}Cu_1Si_{14}B_9Nb_5$ | 100 | 5.4 | 540 | 200 |
| 14 | $Fe_{70}Cu_1Si_{14}B_8Nb_7$ | 120 | 5.2 | 540 | 200 |
| 15 | $Fe_{70}Ni_8Si_{13}B_9$ (Amorphous) | 100 | 5.2 | 400 | 400 |
| 16 | $Co_{69.5}Fe_{0.5}Mn_6Si_{15}B_9$ (Amorphous) | 100 | 5.3 | 400 | 400 |
| 17 | $Co_{67}Fe_4Mo_{1.5}Si_{16.5}B_{11}$ (Amorphous) | 100 | 5.2 | 400 | 400 |
| 18 | 50 wt. % Ni-Fe permalloy | — | 5.1 | — | — |
| 19 | 80 wt. % Ni-Fe permalloy | — | 5.2 | — | — |

The control magnetizing properties (ΔBr, ΔBb, Hr and Gr) of the magnetic core were measured using the measuring circuit shown in FIG. 4. The results are shown in Table 2.

TABLE 2

| No. | ΔBr (T) | ΔBb (T) | Hr (A/m) | Gr (T/(A/m)) |
|---|---|---|---|---|
| Invention | | | | |
| 1 | 2.48 | 0.05 | 13.1 | 0.148 |
| 2 | 2.47 | 0.08 | 11.8 | 0.162 |
| 3 | 2.48 | 0.07 | 15.4 | 0.125 |
| 4 | 2.48 | 0.10 | 12.9 | 0.148 |
| 5 | 2.30 | 0.06 | 17.5 | 0.102 |
| 6 | 2.04 | 0.07 | 8.1 | 0.195 |
| Comparison | | | | |
| 7 | 2.49 | 0.03 | 21.4 | 0.092 |
| 8 | 2.48 | 0.09 | 9.4 | 0.203 |
| 9 | 2.48 | 0.14 | 10.0 | 0.187 |
| 10 | 2.48 | 0.04 | 20.5 | 0.095 |
| 11 | 2.47 | 0.13 | 10.2 | 0.184 |
| 12 | 2.31 | 0.06 | 20.7 | 0.087 |
| 13 | 2.03 | 0.09 | 7.0 | 0.222 |
| 14 | 1.91 | 0.10 | 10.7 | 0.135 |
| 15 | 2.80 | 0.12 | 44.4 | 0.048 |
| 16 | 1.51 | 0.03 | 13.8 | 0.086 |
| 17 | 1.06 | 0.05 | 5.9 | 0.137 |
| 18 | 2.97 | 0.03 | 84.6 | 0.028 |
| 19 | 1.41 | 0.14 | 27.6 | 0.037 |

As seen from Table 2, Nos. 9, 11, 14 failed to show the control magnetizing properties required in the present invention due to a tension larger than 20 gf/mm width. Since the thickness tolerance was larger than 0.3 mm, Nos. 8 and 13 also failed to meet the requirement of the present invention. In addition, the temperature for crystallization was 590° C., Nos. 7, 10 and 12 also failed to meet the requirement of the present invention.

A conductive wire was wound around each magnetic core after placing it in a resin case so as to have the number of turns shown in Table 4 to produce each saturable reactor as shown in FIG. 3. Each magnetic amplifier type two-output switching regulator as shown in FIG. 1 was constructed by using the saturable reactor thus produced, and the control performance, the temperature rise and the reset current at no load were measured. The switching regulator was operated at a switching frequency of 50 kHz under the following conditions.

TABLE 3

| Input | Main Output (V1) | | Secondary Output (V2) | |
|---|---|---|---|---|
| Voltage (V) | Output Voltage (V) | Load Current (A) | Output Voltage (V) | Load Current (A) |
| 90 to 187 | +5.0 | 1 to 20 | +3.3 | 0 to 20 |

The temperature rise ΔT was measured on the surface of the saturable reactor one hour after the operation was initiated while air-cooling the saturable reactor with a cooling fun stopped. The control performance was judged as "good" when the output voltage of the secondary output V2 was +3.135 V to +3.465 V, and "poor" if otherwise.

TABLE 4

| No. | Number of Turns | Control Performance | Temperature Rise ΔT (° C.) No Load | Temperature Rise ΔT (° C.) Maximum Load | Reset Current (mA) |
|---|---|---|---|---|---|
| Invention | | | | | |
| 1 | 8 | good | 22 | 35 | 35 |
| 2 | 8 | good | 21 | 35 | 32 |
| 3 | 8 | good | 26 | 37 | 39 |
| 4 | 8 | good | 22 | 35 | 34 |
| 5 | 9 | good | 25 | 38 | 42 |
| 6 | 10 | good | 17 | 37 | 27 |
| Comparison | | | | | |
| 7 | 8 | good | 27 | 42 | 41 |
| 8 | 8 | poor | 18 | 33 | 25 |
| 9 | 8 | poor | 18 | 32 | 23 |
| 10 | 8 | good | 36 | 48 | 57 |
| 11 | 8 | poor | 18 | 33 | 24 |
| 12 | 9 | good | 31 | 44 | 50 |
| 13 | 10 | poor | 12 | 39 | 15 |
| 14 | 11 | good | 14 | 46 | 21 |
| 15 | 8 | poor | 61 | 72 | 93 |
| 16 | 13 | good | 10 | 41 | 20 |
| 17 | 17 | good | 6 | 58 | 5 |
| 18 | 16 | good | 39 | 84 | 108 |
| 19 | 13 | poor | 23 | 57 | 32 |

The surrounding temperature is usually controlled to about 50° C. or lower for a satisfactory operation of the switching regulator. When the surrounding temperature is 50° C., the temperature rise of the surrounding atmosphere from room temperature is about 20° C. Therefore, considering the insulating grade E (JIS C 4003) of the insulating material constituting the parts of the switching regulator, the temperature rise ΔT of the surface of the saturable reactor should be regulated to 40° C. or lower. The insulating grade E of JIS C 4003 means insulation sufficiently withstanding a temperature of 120° C.

As seen from Table 4, any of the comparative saturable reactors (Nos. 7–19) showed a poor control performance and/or a high temperature rise. Therefore, the size of the core used in the comparative saturable reactor should be increased to ensure a satisfactory operation of the switching regulator, thereby resulting in an unfavorable increase in the size of apparatus.

On the other hand, the switching regulators utilizing the saturable reactors of the present invention showed a good control performance and a temperature rise ΔT lower than 40° C., whereas the number of turns was small and the size of the magnetic core was small, thereby enabling to reduce the size of the switching regulator.

Also, the results showed that the reset current at no load was 42 mA, at most, in the present invention. This enhances the efficiency of the switching regulator because the control power consumed is low.

EXAMPLE 2

The control performance, the temperature rise and the reset current at no load were measured in the same manner as above except for changing the switching frequency to 100 kHz.

TABLE 5

| No. | Number of Turns | Control Performance | Temperature Rise ΔT (° C.) No Load | Temperature Rise ΔT (° C.) Maximum Load | Reset Current (mA) |
|---|---|---|---|---|---|
| Invention | | | | | |
| 1 | 7 | good | 24 | 34 | 45 |
| 2 | 7 | good | 23 | 33 | 43 |
| 3 | 7 | good | 29 | 39 | 52 |
| 4 | 7 | good | 25 | 35 | 46 |
| 5 | 7 | good | 28 | 39 | 56 |
| 6 | 7 | good | 19 | 31 | 36 |
| Comparison | | | | | |
| 7 | 7 | good | 32 | 43 | 55 |
| 8 | 7 | poor | 20 | 31 | 34 |
| 9 | 7 | poor | 22 | 32 | 32 |
| 10 | 7 | good | 39 | 51 | 77 |
| 11 | 7 | poor | 20 | 31 | 33 |
| 12 | 7 | good | 39 | 49 | 75 |
| 13 | 7 | poor | 16 | 28 | 24 |
| 14 | 8 | good | 19 | 53 | 34 |
| 15 | — | — | — | — | — |
| 16 | 8 | good | 16 | 43 | 46 |
| 17 | 8 | good | 11 | 41 | 21 |
| 18 | — | — | — | — | — |
| 19 | 9 | poor | 37 | 69 | 78 |

As seen from Table 5, any of the comparative saturable reactors (Nos. 7–19) showed a poor control performance and/or a high temperature rise. In particular, the measurements were not practicable in Nos. 15 and 18 due to extreme temperature rise. Therefore, the size of the core used in the comparative saturable reactor should be increased to ensure a satisfactory operation of the switching regulator, thereby resulting in an unfavorable increase in the size of apparatus.

On the other hand, the switching regulators utilizing the saturable reactors of the present invention showed a good control performance and a temperature rise ΔT lower than 40° C., whereas the number of turns was small and the size of the magnetic core was small, thereby enabling to reduce the size of the switching regulator. Also, the results showed that the reset current at no load was 56 mA, at most, in the present invention. This enhances the efficiency of the switching regulator because the control power consumed is low.

EXAMPLE 3

The control performance, the temperature rise and the reset current at no load were measured in the same manner as above except for changing the switching frequency to 150 kHz.

TABLE 6

| No. | Number of Turns | Control Performance | Temperature Rise ΔT (° C.) No Load | Temperature Rise ΔT (° C.) Maximum Load | Reset Current (mA) |
|---|---|---|---|---|---|
| Invention | | | | | |
| 1 | 5 | good | 28 | 35 | 87 |
| 2 | 5 | good | 27 | 35 | 82 |
| 3 | 5 | good | 32 | 39 | 94 |
| 4 | 5 | good | 28 | 36 | 88 |
| 5 | 5 | good | 31 | 39 | 97 |
| 6 | 5 | good | 22 | 32 | 69 |
| Comparison | | | | | |
| 7 | 5 | good | 38 | 46 | 108 |
| 8 | 5 | poor | 24 | 31 | 65 |
| 9 | 5 | poor | 27 | 35 | 61 |
| 10 | 6 | good | 39 | 56 | 121 |
| 11 | 5 | poor | 23 | 32 | 63 |
| 12 | 6 | good | 38 | 56 | 119 |
| 13 | 5 | poor | 19 | 30 | 47 |
| 14 | 6 | good | 23 | 43 | 54 |
| 15 | — | — | — | — | — |
| 16 | 6 | good | 29 | 48 | 69 |
| 17 | 6 | good | 18 | 41 | 37 |
| 18 | — | — | — | — | — |
| 19 | 9 | poor | 39 | 83 | 112 |

As seen from Table 6, any of the comparative saturable reactors (Nos. 7–19) showed a poor control performance and/or a high temperature rise. In particular, the measurements were not practicable in Nos. 15 and 18 due to extreme temperature rise. Therefore, the size of the core used in the comparative saturable reactor should be increased to ensure a satisfactory operation of the switching regulator, thereby resulting in an unfavorable increase in the size of apparatus.

On the other hand, the switching regulators utilizing the saturable reactors of the present invention showed a good control performance and a temperature rise ΔT lower than 40° C., whereas the number of turns was small and the size of the magnetic core was small, thereby enabling to reduce the size of the switching regulator. Also, the results showed that the reset current at no load was 97 mA, at most, in the present invention. This enhances the efficiency of the switching regulator because the control power consumed is low.

EXAMPLE 4

The dependency of the number of turns, the control performance, the maximum temperature rise ΔTmax and the reset current at no load on the switching frequency was evaluated in the same manner as in Example 1 while using the magnetic cores of Nos. 2, 5, 6, 8, 10, 14, and 16–18.

TABLE 7

| No. | Number of Turns 20 kHz | 30 kHz | 50 kHz | 100 kHz | 150 kHz | 200 kHz |
|---|---|---|---|---|---|---|
| Invention | | | | | | |
| 2 | 18 | 12 | 8 | 7 | 5 | 5 |
| 5 | 18 | 12 | 8 | 7 | 5 | 5 |
| 6 | 18 | 12 | 8 | 7 | 5 | 5 |

TABLE 7-continued

| No. | Number of Turns 20 kHz | 30 kHz | 50 kHz | 100 kHz | 150 kHz | 200 kHz |
|---|---|---|---|---|---|---|
| Comparison | | | | | | |
| 8 | 18 | 12 | 8 | 7 | 5 | 5 |
| 10 | 18 | 12 | 8 | 7 | 6 | 5 |
| 14 | 22 | 15 | 11 | 8 | 6 | 5 |
| 16 | 32 | 21 | 13 | 8 | 6 | 5 |
| 17 | 42 | 28 | 17 | 8 | 6 | 5 |
| 18 | 15 | 15 | 16 | — | — | — |

TABLE 8

| No. | Control Performance 20 kHz | 30 kHz | 50 kHz | 100 kHz | 150 kHz | 200 kHz |
|---|---|---|---|---|---|---|
| Invention | | | | | | |
| 2 | good | good | good | good | good | good |
| 5 | good | good | good | good | good | good |
| 6 | good | good | good | good | good | good |
| Comparison | | | | | | |
| 8 | poor | poor | poor | poor | poor | poor |
| 10 | good | good | good | good | good | good |
| 14 | poor | good | good | good | good | good |
| 16 | poor | poor | good | good | good | good |
| 17 | poor | poor | good | good | good | good |
| 18 | good | good | good | — | — | — |

TABLE 9

| No. | Maximum Temperature Rise ΔTmax (° C.) 20 kHz | 30 kHz | 50 kHz | 100 kHz | 150 kHz | 200 kHz |
|---|---|---|---|---|---|---|
| Invention | | | | | | |
| 2 | 47 | 38 | 35 | 33 | 35 | 40 |
| 5 | 49 | 40 | 38 | 39 | 39 | 45 |
| 6 | 44 | 36 | 33 | 31 | 32 | 36 |
| Comparison | | | | | | |
| 8 | 45 | 36 | 33 | 31 | 31 | 35 |
| 10 | 59 | 52 | 48 | 51 | 56 | 57 |
| 14 | 62 | 53 | 46 | 53 | 43 | 45 |
| 16 | 73 | 56 | 41 | 43 | 48 | 51 |
| 17 | 87 | 71 | 58 | 41 | 41 | 42 |
| 18 | 39 | 55 | 84 | — | — | — |

TABLE 10

| No. | Reset Current at No Load (mA) 20 kHz | 30 kHz | 50 kHz | 100 kHz | 150 kHz | 200 kHz |
|---|---|---|---|---|---|---|
| Invention | | | | | | |
| 2 | 9 | 16 | 33 | 41 | 76 | 93 |
| 5 | 11 | 18 | 35 | 45 | 82 | 102 |
| 6 | 7 | 12 | 25 | 33 | 61 | 76 |
| Comparison | | | | | | |
| 8 | 7 | 14 | 28 | 37 | 67 | 83 |
| 10 | 16 | 25 | 47 | 62 | 113 | 144 |

TABLE 10-continued

| No. | Reset Current at No Load (mA) 20 kHz | 30 kHz | 50 kHz | 100 kHz | 150 kHz | 200 kHz |
|---|---|---|---|---|---|---|
| 14 | 8 | 17 | 32 | 41 | 74 | 89 |
| 16 | 5 | 8 | 16 | 46 | 66 | 109 |
| 17 | 3 | 4 | 6 | 21 | 28 | 43 |
| 18 | 58 | 78 | 97 | — | — | — |

As seen from the results, the switching regulators of the present invention simultaneously satisfied the requirements of a good control performance and the maximum temperature rise ΔTmax of 40° C. or lower at the switching frequency over a range of 30 kHz to 150 kHz. It would appear that such a simultaneous satisfaction cannot be attained by using the comparative magnetic cores.

Namely, when the switching frequency is set in the range of 30–150 kHz, which is lower than the lower limit of the frequency range regulated by CISPR Pub. 11, the magnetic cores of the present invention are advantageous over the comparative magnetic cores in producing a saturable reactor and a switching regulator with a reduced size, a high efficiency and a high reliability. Also, the noise terminal voltage can be easily avoided by using the magnetic cores of the present invention. In addition, the number of turns can be reduced by using the magnetic core of the present invention without sacrificing the performance of the switching regulator in a broad switching frequency of 30–150 kHz. This enhances the productivity.

As described above, the magnetic core of the present invention provides a saturable reactor having a low voltage drop without using additional circuit elements as required in the prior art even when the load current is large, and having a low temperature rise even when operated at a higher frequency. A magnetic amplifier type multi-output switching regulator constructed by the saturable reactor having the magnetic core of the present invention has various advantages such as a good control performance even when the load current is large, a low temperature rise, a small size, a high efficiency, a reduced number of parts required for construction, an easy control of the noise terminal voltage, etc. With such advantages, a highly reliable switching apparatus can be obtained, which is particularly suitable as the switching regulator for use in computers requiring a low voltage and a large load current.

What is claimed is:

1. A multi-output switching regulator having a magnetic amplifier comprising a saturable reactor, wherein said saturable reactor has a magnetic core made of an Fe-based soft-magnetic alloy comprising as essential alloying elements Fe, Cu and M, wherein M is at least one element selected from the group consisting of Nb, W, Ta, Zr, Hf, Ti and Mo, and having an alloy structure at least 50% in area ratio of which being fine crystalline particles having an average particle size of 100 nm or less, said magnetic core having, when measured at a core temperature of 25° C. using a 50 kHz monopolar rectangular voltage with an on-duty ratio of 0.5, control magnetizing properties of:

0.12 T or less of a residual operating magnetic flux density ΔBb;

2.0 T or more of a total control operating magnetic flux density ΔBr; and 0.10–0.20 T/(A/m) of a total control gain Gr calculated by the equation:

$$Gr=0.8\times(\Delta Br-\Delta Bb)/Hr$$

wherein Hr is a total control magnetizing force defined as a control magnetizing force corresponding to 0.8×(ΔBr−ΔBb)+ΔBb.

2. The multi-output switching regulator according to claim 1, wherein said multi-output switching regulator comprises:

a primary circuit comprising an input power source, a switching element and a primary winding of a main transformer; and a secondary circuit comprising a main output circuit for controlling a main output by a pulse-width controlling operation of said switching element and a secondary output circuit comprising said magnetic amplifier for controlling a secondary output, said main output circuit and said secondary output circuit being respectively connected to the same secondary winding of said main transformer.

3. The multi-output switching regulator according to claim 2, wherein an output voltage of said main output is +5V and an output voltage of said secondary output is +3.3V.

4. The multi-output switching regulator according to claim 1, wherein a switching frequency is 30–150 kHz.

5. A computer equipped with the multi-output switching regulator according to claim 1.

* * * * *